(12) United States Patent
Lum et al.

(10) Patent No.: US 9,355,430 B2
(45) Date of Patent: May 31, 2016

(54) TECHNIQUES FOR INTERLEAVING SURFACES

(71) Applicant: NVIDIA CORPORATION, Santa Clara, CA (US)

(72) Inventors: Eric B. Lum, San Jose, CA (US); Cass W. Everitt, Austin, TX (US); Henry Packard Moreton, Woodside, CA (US); Yury Y. Uralsky, Moscow (RU); Cyril Crassin, Paris (FR); Jerome F. Duluk, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 167 days.

(21) Appl. No.: 14/033,389

(22) Filed: Sep. 20, 2013

(65) Prior Publication Data
US 2015/0084974 A1 Mar. 26, 2015

(51) Int. Cl.
*G09G 5/39* (2006.01)
*G06T 1/60* (2006.01)
(52) U.S. Cl.
CPC .......................... *G06T 1/60* (2013.01)
(58) Field of Classification Search
CPC ....... G06T 1/60; G06T 15/04; G06F 12/0607; G06F 12/10; G06F 13/1647; G09G 2360/123
See application file for complete search history.

(56) References Cited

U.S. PATENT DOCUMENTS

| 6,057,861 A * | 5/2000 | Lee et al. .................. 345/569 |
| 7,872,657 B1 * | 1/2011 | Edmondson et al. .......... 345/544 |
| 2011/0072177 A1* | 3/2011 | Glasco et al. ................. 710/244 |

* cited by examiner

*Primary Examiner* — Hau Nguyen
(74) *Attorney, Agent, or Firm* — Artegis Law Group, LLP

(57) ABSTRACT

One embodiment sets forth a method for allocating memory to surfaces. A software application specifies surface data, including interleaving state data. Based on the interleaving state data, a surface access unit bloats addressees derived from discrete coordinates associated with the surface, creating a bloated virtual address space with a predictable pattern of addresses that do not correspond to data. Advantageously, by creating predictable regions of addresses that do not correspond to data, the software application program may configure the surface to share physical memory space with one or more other surfaces. In particular, the software application may map the virtual address space together with one or more virtual address spaces corresponding to complementary data patterns to the same physical base address. And, by overlapping the virtual address spaces onto the same pages in physical address space, the physical memory may be more densely packed than by using prior-art allocation techniques.

20 Claims, 5 Drawing Sheets

TECHNIQUES FOR INTERLEAVING SURFACES

BACKGROUND OF THE INVENTION

1. Field of the Invention

The present invention generally relates to graphics processing and, more specifically, to techniques for interleaving surfaces.

2. Description of the Related Art

A graphics processing unit (GPU) is often configured to perform specific tasks included in the graphics pipeline (the collection of processing steps performed to transform 3-D images into rendered 2-D images). GPUs typically represent the surface appearance of objects using 2-D surfaces, such as textures. In general, textures include a variety of data, such as color or transparency, which may vary across the surface of the object. In particular, each texture includes an array of texels representing the value of characteristics at particular points on the surface of the object. To realistically portray a complex graphics scene in fine detail often requires many large textures and a correspondingly large amount of memory. Because the amount of physical memory local to the GPU (local memory) is limited, rendering such complex graphics scenes often exceeds the capacity of the local memory. Accessing physical memory that is not local to the GPU, such as system memory, introduces relatively large latencies and reduces the throughput of the graphics pipeline.

Local memory limitations may be further exacerbated by how memory is typically allocated. Memory is typically allocated in discrete units, such as a page, of a fixed size (e.g., 32 KB, 64 KB, etc.) that are contiguous within the physical memory space. Typically, to store the data associated with a texture in physical memory, the texture is divided into tiles of data, where the size of the tile matches the size of a page. Some textures are "sparse," meaning that the textures include many areas that do not include any data (e.g., areas where there are no visible objects). And many sparse textures include partially filled tiles (e.g., only the upper half of the tile includes useful data). Since a page of memory is allocated for each tile that includes useful information, each partially filled tile wastes physical memory. For example, suppose that the size of a page were 64 KB. Further, suppose that a texture were to include 2 tiles, with each tile including 1 KB of data. In such a scenario, the GPU would allocate two pages of local memory (a total of 128 KB) to represent the 2 KB of data, thereby wasting 126 KB of physical memory.

One approach to addressing the above problems is to decrease the size of the pages when allocating physical memory. Decreasing the size of the pages increases the likelihood that a sparse texture includes empty pages that do not contribute to unnecessary memory waste. For instance, suppose that the size of a page were 64 KB and a texture "TA" were to include two 64 KB tiles, where only the top half of each tile included useful data. The GPU would allocate 128 KB to represent the texture "TA." In contrast, suppose that the page size were reduced to 32 KB. The texture "TA" would then include two 32 KB pages that included useful data and two 32 KB empty pages. Consequently, the GPU would allocate only 64 KB to represent the texture "TA."

One limitation to reducing the page size is that smaller page sizes reduce overall memory efficiency. More specifically, GPUs employ virtual memory to enable processes to address more memory than is supported by the available local physical memory. The virtual memory is typically allocated in pages of the same size as the physical memory. A TLB (translation lookaside buffer) is used to speed up the translation between virtual pages and physical pages. However, a TLB is limited in size and, thus, only represents a subset of the virtual memory pages. When a virtual memory page that is not included in the TLB is accessed, a "TLB miss" occurs and the memory efficiency is degraded. As the page allocation size decreases, the number of memory addresses that the TLB spans also decreases and, consequently, the likelihood of TLB misses increases. The resulting decrease in memory efficiency due to TLB misses may very well exceed the increase in memory efficiency attributable to reducing the page size when working with sparse textures.

In another approach to allocating physical memory, pages are shared between certain textures. More specifically, one or more textures that share the same sparse allocation pattern, the same size, and the same shape are assigned to share a particular page in both virtual and physical memory. For example, suppose that both a texture "A" and a texture "B" were to include useful data in the same set of texels and in no other texels. The GPU would be configured to divide the textures into tiles corresponding to half the page size. The GPU would then map the texture "A" and the texture "B" to the same virtual address space, mapping the data included in texture "A" to the top half of each page and the data included in texture "B" to the bottom half of each page. Reducing the tile size and, subsequently, packing the tiles into pages in virtual memory increases the number of empty pages and reduces the amount of allocated physical memory. However, this approach is limited to textures that share the same sparse allocation pattern, the same size, and the same shape. Consequently, rendering many complex scenes is still adversely impacted by allocating physical memory to sparse textures with differing allocation patterns, sizes, and shapes.

As the foregoing illustrates, what is needed in the art is a more efficient and flexible technique to allocate physical memory, especially when working with sparse textures.

SUMMARY OF THE INVENTION

One embodiment of the present invention sets forth a method for allocating memory to surfaces. The method includes receiving first surface data related to a first surface, receiving first surface state data related to the first surface, computing a first bloat based on the first surface state data, mapping the first surface data to a first surface virtual address space based on the first bloat, and mapping one or more pages included in the first surface virtual address space to a physical address.

Other embodiments of the present invention include, without limitation, a computer-readable storage medium including instructions that, when executed by a processing unit, cause the processing unit to implement aspects of the techniques described herein as well as a system that includes different elements configured to implement aspects of the techniques described herein.

One advantage of implementing the disclosed techniques is that a software application may allocate physical memory flexibly across multiple different surfaces. In particular, the software application may interleave multiple surfaces representing any combination of allocation patterns, sizes, and shapes in physical memory. Advantageously, by strategically specifying surface-specific interleaving strides and offsets, the software may tune the allocation of physical memory to ensure that the overall memory efficiency is increased.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
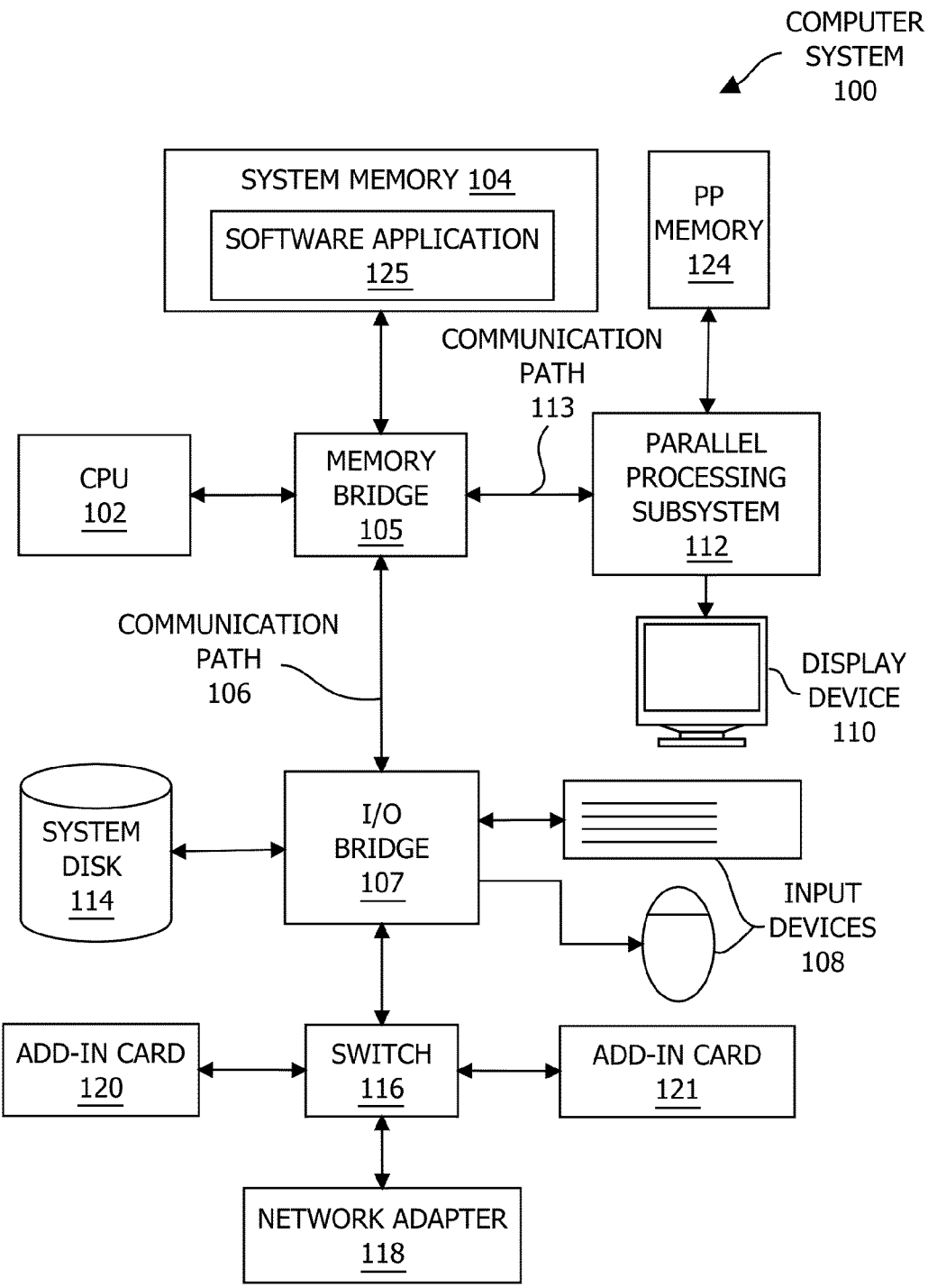
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 102 and a system memory 104 communicating via an interconnection path that may include a memory bridge 105. The memory bridge 105, which may be, e.g., a Northbridge chip, is connected via a bus or other communication path 106 (e.g., a HyperTransport link) to an I/O (input/output) bridge 107. The I/O bridge 107, which may be, e.g., a Southbridge chip, receives user input from one or more user input devices 108 (e.g., keyboard, mouse) and forwards the input to the CPU 102 via the communication path 106 and the memory bridge 105. A parallel processing subsystem 112 is coupled to the memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to the I/O bridge 107. A switch 116 provides connections between the I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to the I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

As shown, the parallel processing subsystem 112 is coupled to a local parallel processing (PP) memory 124. The parallel processing subsystem 112 and the parallel processing memory 124 may be implemented using one or more integrated circuit devices, such as programmable processors, application specific integrated circuits (ASICs), or memory devices, or in any other technically feasible fashion. As shown, the parallel processing subsystem 112 communicates with the rest of computer system 100 via the communication path 113, which connects to the memory bridge 105 (or, in one alternative embodiment, directly to the CPU 102). The connection of the parallel processing subsystem 112 to the rest of the computer system 100 may also be varied. In some embodiments, the parallel processing subsystem 112 is implemented as an add-in card that can be inserted into an expansion slot of the computer system 100. In other embodiments, the parallel processing subsystem 112 can be integrated on a single chip with a bus bridge, such as the memory bridge 105 or the I/O bridge 107. In still other embodiments, some or all elements of the parallel processing subsystem 112 may be integrated on a single chip with the CPU 102. In one embodiment, the communication path 113 is a PCI Express link. Other communication paths may also be used.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, the CPU 102, and the I/O bridge 107 to form a system on chip (SoC).

The parallel processing subsystem 112 may be provided with any amount of parallel processing memory 124 and may use the parallel processing memory 124 and the system memory 104 in any combination. The parallel processing subsystem 112 may transfer data from system memory 104 and/or the local parallel processing memory 124 into internal (on-chip) memory, process the data, and write result data back to system memory 104 and/or the local parallel processing memory 204, where such data can be accessed by other system components, including CPU 102 or another parallel processing subsystem 112.

In operation, the CPU 102 is the master processor of the computer system 100, controlling and coordinating operations of other system components. In particular, the CPU 102 issues commands that control the operation of the parallel processing subsystem 112. Those commands may originate within a software application 125 resident in the system memory 104 and executing on the CPU 102. Advantageously, the parallel processing subsystem 112 may execute commands asynchronously relative to the operation of CPU 102.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, the system memory 104 is connected to the CPU 102 directly rather than through a bridge, and other devices communicate with the system memory 104 via the memory bridge 105 and the CPU 102. In other alternative topologies, the parallel processing subsystem 112 is connected to the I/O bridge 107 or directly to the CPU 102, rather than to the memory bridge 105. In still other embodiments, the I/O bridge 107 and the memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, the switch 116 is eliminated, and the network adapter 118 and the add-in cards 120, 121 connect directly to the I/O bridge 107.

Figure 2:
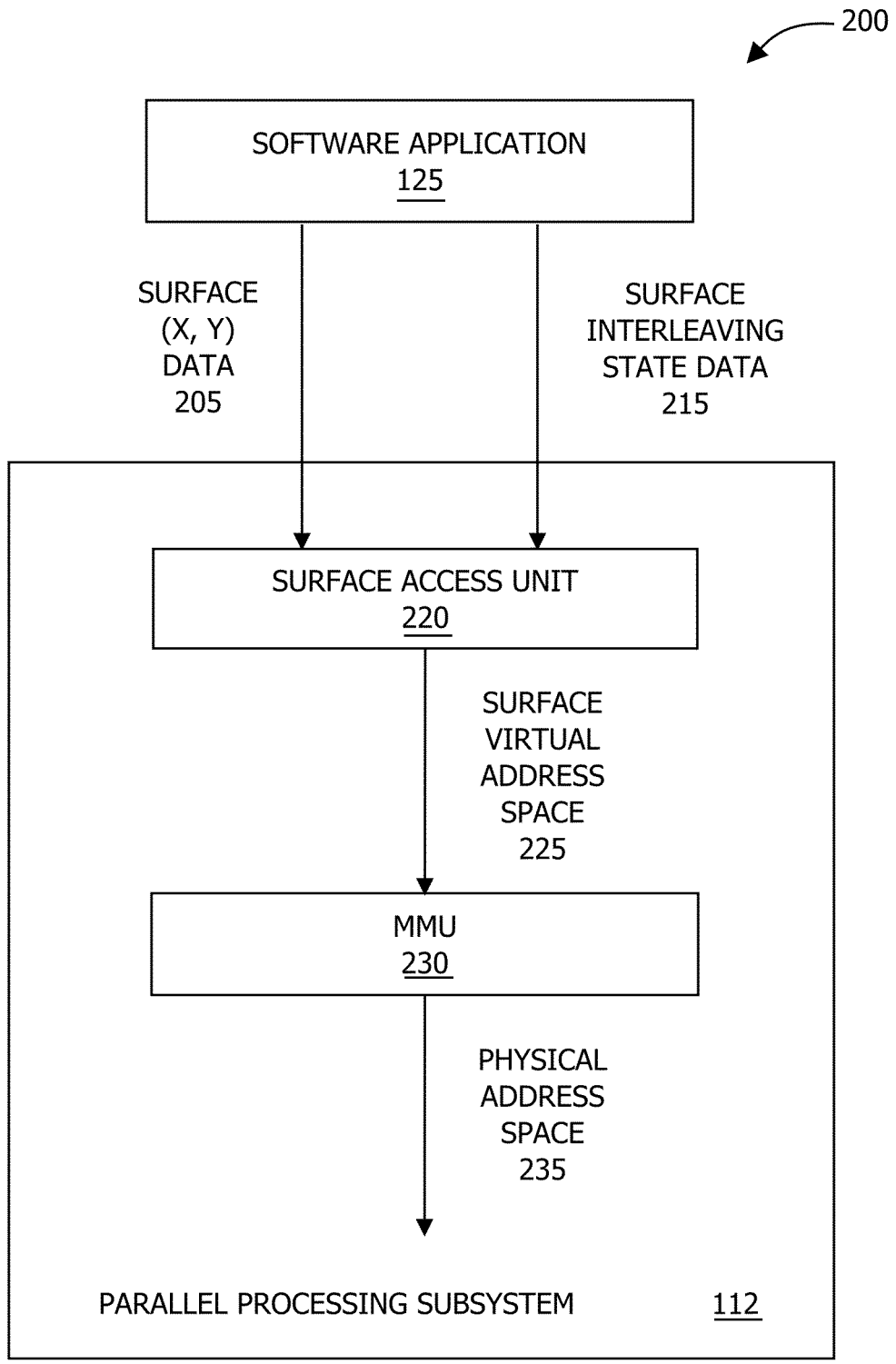
FIG. 2 is a is a conceptual diagram illustrating how memory is allocated to surfaces within the parallel processing subsystem of FIG. 1, according to one embodiment of the present invention.

FIG. 2 is a is a conceptual diagram illustrating how memory is allocated to surfaces within the parallel processing subsystem 112 of FIG. 1, according to one embodiment of the present invention. Together, the software application 125 of FIG. 1, a surface access unit 220, and a memory management unit (MMU) 230 allocate the parallel processing memory 124 of FIG. 1 to surfaces, such as textures. The surface access unit 220 may be any component of the parallel processing subsystem 112 that is configured to access 1-D, 2-D, or 3-D surfaces on a surface level, such as a raster operations unit (ROP) or a texture unit. The MMU 230, among other things, translates pages in one or more surface virtual address spaces 225 within an application program's virtual address space to pages in a physical address space 235.

To ensure optimal memory efficiency, the software application 125 controls and coordinates some of the memory-related operations of the surface access unit 220 and the MMU 230. In particular, for each surface, the software application 125 configures the surface access unit 220 using surface (x, y) data 205 and surface interleaving state data 215. In addition, again for each surface, the software application 125 specifies a base index into a pool of pages in the physical address space 235. The MMU 230 uses the base indices to map surface virtual address spaces 225 to the physical address space 235. Advantageously, the software application 125 may use the surface interleaving state data 215 to strategically allocate the parallel processing memory 124 across multiple surfaces in a coordinated manner. In particular, by making knowledgeable tradeoffs for each surface between the amount of parallel processing memory 124 used to represent the surface and the likelihood of TLB misses, the software application 125 may increase memory efficiency.

The surface (x, y) data 205 includes the values of particular surface characteristics, such as lighting and color, at discrete (x, y) coordinates (i.e., texels). Advantageously, the software application 125 is configured to minimize the amount of parallel processing memory 124 used to represent partially filled tiles included in sparse surfaces. More specifically, the software application 125 uses the surface interleaving state data 215 to combine data from multiple partially filled tiles included in different surfaces into a single, more densely-packed page in the physical address space 235. Consequently, the parallel processing subsystem 112 allocates less parallel processing memory 124 to represent these sparse surfaces than the parallel processing subsystem 112 would allocate using prior-art techniques.

Each surface interleaving state data 215 corresponds to a separate surface. However, the software application 125 may coordinate multiple surface interleaving state data 215 to cause the corresponding surfaces to interleave in the physical address space 235. The surfaces participating in each interleave do not necessarily share any allocation attributes, such as size, shape, and allocation pattern (i.e., the pattern of useful data included in the surface). For instance, a 2 KB by 2 KB level of a mipmap, a 1 KB by 2 KB sparse texture, a 1 KB by 2 KB densely-packed texture, and a 16 KB by 4 KB texture may all participate in a single interleave. To effectively interleave multiple surface (x, y) data 205, the software application 125 maps the multiple surfaces to the same base index into the pool of pages in the physical address space 235. The software strategically bloats the surface virtual address spaces 225 corresponding to the interleaving surfaces to ensure that multiple interleaving surface (x, y) data 205 are not mapped to the same address in the physical address space 235. Notably, the software application 125 directs the surface access unit 220 to insert different regions of addresses that do not correspond to surface (x, y) data 205 into each of the interleaving surface virtual address spaces 225.

To bloat the surface virtual address spaces 225, the software application 125 uses the surface interleaving state data 215 to specify the location and values of one or more interleaf bits. Subsequently, the surface access unit 220 reads the surface interleaving state data 215 and inserts the interleaf bits into the set of address bits representing the (x, y) coordinates associated with the corresponding surface (x, y) data 205. The surface access unit 220 may insert interleaf bits before, after, or within the x coordinate bits, the y coordinate bits, or both the x and y coordinate bits. Further, the surface access unit 220 inserts the interleaf bits based on the particular format that the parallel processing subsystem 112 uses for storing data in the parallel processing memory 124. For instance, in some embodiments, the format that the parallel processing subsystem 112 uses for storing data is pitch linear format. In pitch linear format, the surface (x, y) data 205 is stored sequentially, followed by the data included in the second row, and so on. In other embodiments, the format that the parallel processing subsystem 112 uses for storing data is block linear format. In block linear format, the surface (x, y) data 205 is stored in blocks, with the blocks stored in a row-by-row basis, where the size of the block can be based on the size of a page.

For example, suppose that the surface (x, y) data 205 "S0" (i.e., corresponding to a surface "S0") were to specify that a surface "S0" was 256 bytes by 256 bytes. And suppose that the surface interleaving data 215 "S0" were to specify an interleaving between the surface "S0" and a surface "S1." Further, suppose that the parallel processing subsystem 112 were configured to implement pitch linear memory allocation. Finally, suppose that the surface interleaving data 215 "S0" were to specify to insert one bit with a value of "0" between the x address bits and the y address bits. In such a scenario, the surface access unit 220 would compute a corresponding bloat (x, y) for surface "S0" to be [8bY] [1b0] [8bX]. In other words, the surface access unit 220 would concatenate the 8 y address bits, the insertion bit '0,' and the 8 x address bits to form the bloat (x, y). Using this bloat (x, y) for the surface "S0," the surface access unit 220 would populate the even rows (i.e., row 0, row 2, etc.) in the surface virtual address space 225 "S0" with information included in the surface (x, y) data 205 "S0." In contrast, the surface access unit 220 would not populate the odd rows in the surface virtual address space 225 "S0." Similarly, suppose that the software application 125 were to configure the surface access unit 220 to compute a bloat (x, y) for surface "S1" to be [8bY] [1b1] [8bX]. Using this bloat (x, y) "S1," the surface access unit 220 would populate the odd rows (i.e., row 1, row 3, etc.) in the surface virtual address space 225 "S1" with information included in the surface (x, y) data 205 "S1." The surface access unit 220 would not populate the even rows in the surface virtual address space 225 "S1."

Advantageously, the effective page size (i.e., the size of blocks of addresses corresponding to data) of one or more of the surface virtual address spaces 225 may be a fraction of the size of a page of the physical address space 235. More specifically, because of the controlled bloating, the effective page size included in the surface virtual address space 225 is based on the number of interleaving surfaces and the number and location of the interleaf bits. Further, the effective page size may vary per surface. For instance, suppose that a particular surface were to be configured to interleave with one other surface and to populate alternate columns in the corresponding surface virtual address space 225. The effective page size of the surface virtual address space 225 corresponding to this particular surface would be half the size of a page of the physical address space 235.

As previously disclosed herein, the software application 125 configures the MMU 230 to map each surface virtual address space 225 to a particular base address within the physical address space 235. Notably, the software application 125 configures the MMU 230 to map all of the surface virtual address spaces 225 corresponding to the surfaces participating in an interleave to the same base address within the physical address space 235. Again, the MMU 230 only maps populated pages (i.e., pages that correspond to data) included in the surface virtual address spaces 225 to the physical address space 235. Advantageously, the MMU 230 maps the pages of each surface virtual address space 225 to the pages of the physical address space 235 independently. For example, suppose that the software application 125 were to configure two surfaces "SA" and "SB" to participate in an interleave. Further, suppose that the first and second pages of the surface virtual address space 225 "SA" were empty, but the third page contained useful information. Further, suppose that the first page of the surface virtual address space 225 "SB" contained useful information. In such a scenario, the MMU 230 would map the third page of the surface virtual address space 225 "SA" and the first page of the surface virtual address space 225 "SB" to the same page in the physical address space 235.

In general, the MMU 230 overlays the populated pages in any set of interleaving surface virtual address spaces 225 to form a contiguous, densely packed region of the physical address space 235. Advantageously, the regions of the interleaving surface virtual address spaces 225 that do not correspond to data ensure that useful data included in the interleaving surfaces do not collide in the physical address space 235. Consequently, the amount of parallel processing memory 124 required to store the useful data included in the interleaving surfaces is reduced compared to prior-art techniques.

It will be appreciated that the system shown herein is illustrative and that variations and modifications are possible. The parallel processing subsystem 112 may contain any number of surface access units 220 in any combination. For instance, the parallel processing subsystem 112 may include any number of ROPs that perform raster operations (e.g., stencil, z test, and the like) and, subsequently, output pixel data. The parallel processing subsystem 112 may also include any number of texture units that perform texture mapping operations, such as reading, sampling, and filtering texture data. The format in which information is transmitted between the components included in the parallel processing subsystem 112 may also vary. In particular, the surface interleaving state data 215 may be transmitted to the parallel processing subsystem 112 in any technically feasible manner. In some embodiments, surface interleaving state data 215 corresponding to a texture may be included in a texture header.

Figure 3:
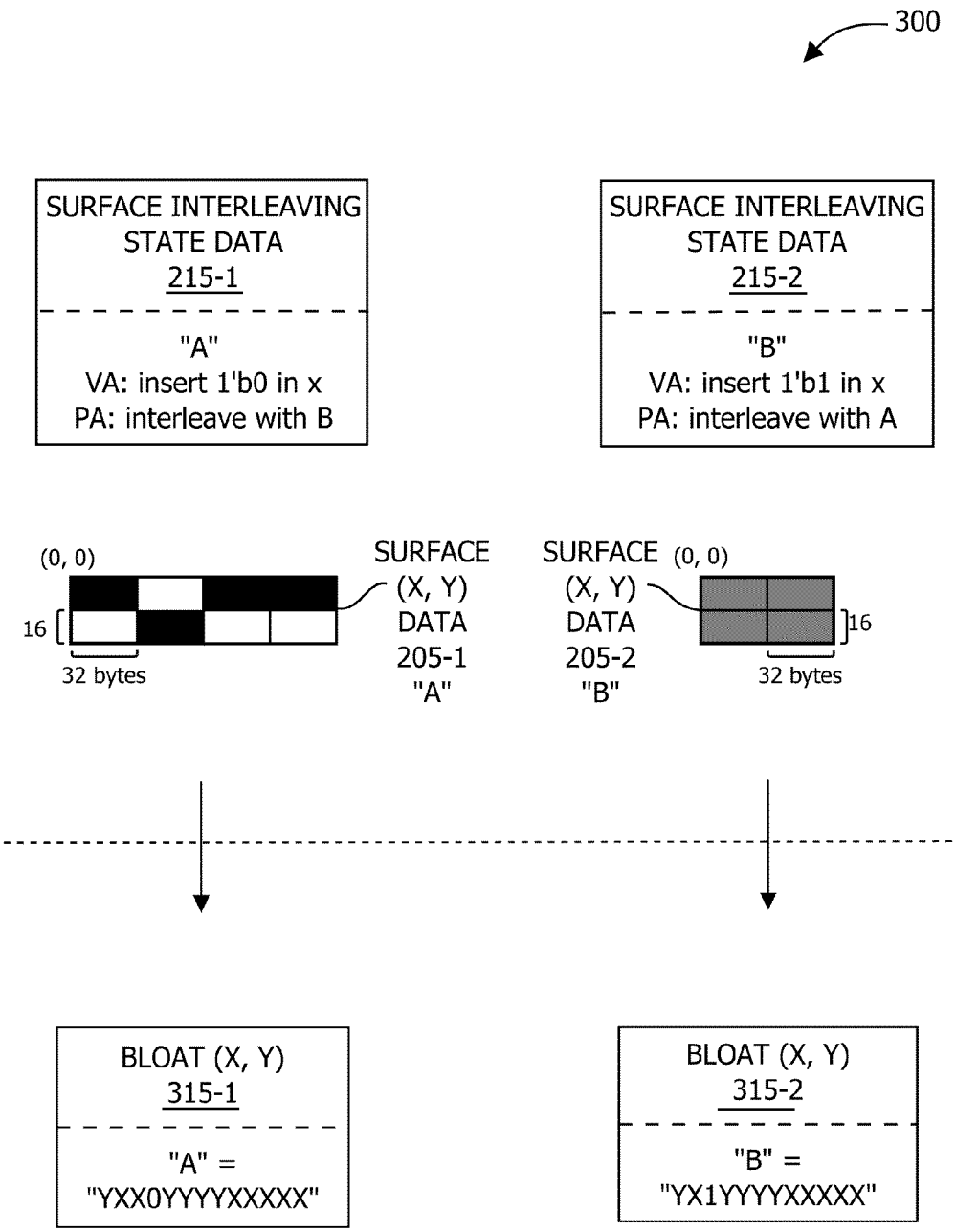
FIG. 3 is a conceptual diagram illustrating the surface interleaving state data and the surface data of FIG. 2 and corresponding bloats, according to one embodiment of the present invention.

FIG. 3 is a conceptual diagram illustrating the surface interleaving state data 215 and the surface (x, y) data 205 of FIG. 2 and corresponding bloats (x, y) 315, according to one embodiment of the present invention. In general, the surface access unit 220 of FIG. 2 computes a number U of bloats (x, y) 315, where U≥1. (Herein, multiple instances of like objects are denoted with reference numbers identifying the object and hyphenated numbers identifying the instance where needed.) More specifically, the surface access unit 220 computes the bloat (x, y) 315-1 that corresponds to a surface "A" and the bloat (x, y) 315-2 that corresponds to a surface "B." Note that the exemplary parallel processing subsystem 112, not shown, in which the surface access unit 220 resides, is configured to store data in pitch linear format in pages of 32 byes by 32 bytes.

First, the surface access unit 220 receives the surface interleaving state data 215-1 and the surface (x, y) data 205-1 corresponding to the surface "A." The surface access unit 220 then receives the surface interleaving state data 215-2 and the surface (x, y) data 205-2 corresponding to the surface "B." As shown, both the surface interleaving state data 215-1 and 215-2 direct the parallel processing subsystem 112 to interleave surface "A" and surface "B" in the physical address space 235. Further, the surface interleaving state data 215-1 directs the surface access unit 220 to insert 1'b0 (i.e., a '0' bit) into the surface virtual address space 225-1 corresponding to the surface "A." And the surface interleaving state data 125-2 directs the surface access unit 220 to insert 1'b1 (i.e., a '1' bit) into the surface virtual address space 225-2 corresponding to the surface "B."

The surface access unit 220 also receives the surface (x, y) data 205-1 and 205-2 corresponding to the surfaces "A" and "B" respectively. As shown, the surface "A" is a sparse surface with a size of 128 bytes by 32 bytes. In contrast, the surface "B" is a fully-populated surface with a size of 64 bytes by 32 bytes. Based on the surface interleaving state data 215-1 and 215-2, the surface access unit 220 divides surface "A" and surface "B" into tiles of 32 byes by 16 bytes (the size of half of a page).

As detailed previous herein, the surface access unit 220 computes the bloat (x, y) 315-1 corresponding to the surface "A" based on the surface interleaving state data 215-1 and the surface (x, y) data 205-1. As persons skilled in the art will understand, to represent the coordinates associated with the example surface (x, y) data 205-1 requires 7 x address bits and 5 y address bits. As shown, the surface access unit 220 splices these 12 address bits with the '0' interleaf bit specified by the surface interleaving state data 215-1 to form the bloat (x, y) 315-1. In particular, the surface access unit 220 orders the bits to map each tile included in the surface (x, y) data 205-1 to the upper half of each of the pages of the surface virtual address space 225 corresponding to the surface "A."

Similarly, the surface access unit 220 computes the bloat (x, y) 315-2 corresponding to the surface "B" based on the surface interleaving state data 215-2 and the surface (x, y) data 205-2. To represent the coordinates associated with the surface (x, y) data 205-2 requires 6 x address bits and 5 y address bits. As shown, the surface access unit 220 splices these 11 address bits with the '1' interleaf bit specified by the surface interleaving state data 215-1 to form the bloat (x, y) 315-2. In particular, the surface access unit 220 orders the bits to map each tile included in the surface (x, y) data 205-2 to the lower half of each of the pages in the surface virtual address space 225 corresponding to the surface "B."

Figure 4:
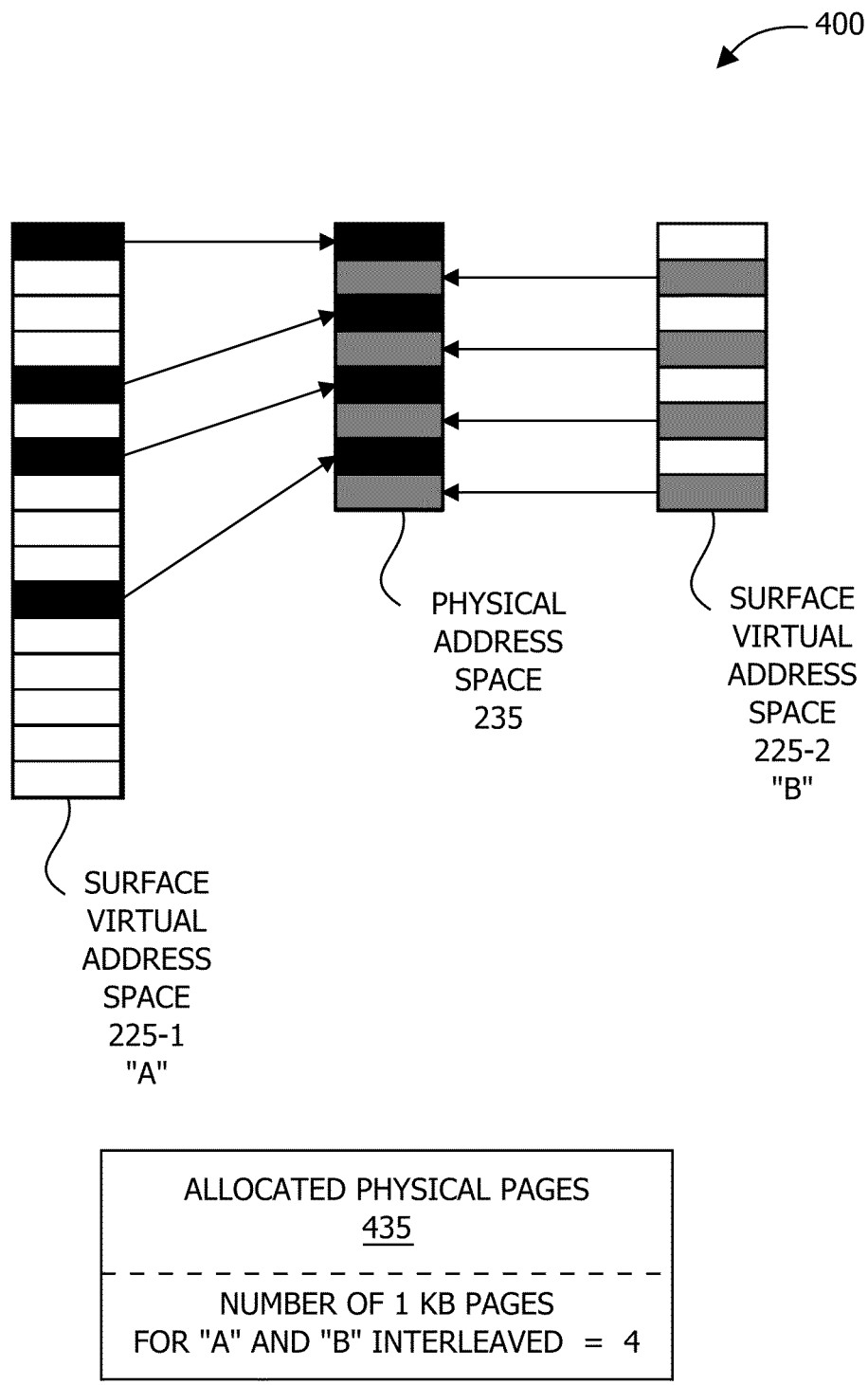
FIG. 4 is a conceptual diagram illustrating the surface virtual address spaces and the physical address space of FIG. 2, according to one embodiment of the present invention.

FIG. 4 is a conceptual diagram illustrating example post-bloat surface virtual address spaces 225-1 and 225-2 and the physical address space 235 of FIG. 2, according to one embodiment of the present invention. The virtual address space 225-1 includes the surface (x, y) data 205-1 of FIG. 3 corresponding to the surface A. The virtual address space 225-2 includes the surface (x, y) data 205-2 of FIG. 2 corresponding to the surface B.

In general, the software application 125 configures the MMU 230 (not shown) to map all of the surface virtual address spaces 225 corresponding to the surfaces participating in an interleave to the same base address in the physical address space 235. For instance, the MMU 230 maps the surface virtual address spaces 225-1 and 225-2 to the same base address in the physical address space 235. The MMU 230 is configured to allocate the physical address space 235 in pages of size 32 byes by 32 bytes.

Referring back to FIG. 2, Both the surface (x, y) data 205-1 and 205-2 include tiles of size 32 bytes by 16 bytes (the size of half of a page). In other words, two such tiles form a single page. The addresses corresponding to the surface (x, y) data 205-1 are all included in the top half of the pages in the surface virtual address space 225-1. In contrast, the addresses corresponding to the surface (x, y) data 205-2 are all included in the bottom half of the pages in the surface virtual address space 225-2.

As shown, the first populated page in the surface virtual address space 225-1 is the first page in the surface virtual address space 225-1. The first populated page in the surface virtual address space 225-2 is the first page in the surface virtual address space 225-2. As also shown, the MMU 230 maps both the first page in the surface virtual address space 225-1 and the first page in the surface virtual address space 225-2 to the first page in the physical address space 235. Advantageously, this mapping creates a densely packed page in the physical memory space 235 without creating any data conflicts.

The second populated page in the surface virtual address space 225-1 is the third page in the surface virtual address space 225-1. The second populated page in the surface virtual address space 225-2 is the second page in the surface virtual address space 225-2. Consequently, the MMU 230 maps both the third page in the surface virtual address space 225-1 and the second page in the surface virtual address space 225-2 to the second page in the physical address space 235.

Similarly, the MMU 230 maps both the fourth page in the surface virtual address space 225-1 and the third page in the surface virtual address space 225-2 to the third page in the physical address space 235. In addition, the MMU 230 maps both the sixth page in the surface virtual address space 225-1 and the fourth page in the surface virtual address space 225-2 to the fourth page in the physical address space 235.

Interleaving the surfaces "A" and "B" in the physical address space 235 in this manner causes the MMU 230 to allocate a total "allocated physical pages" 435 of four 1 KB pages to store both of the surfaces "A" and "B." In contrast, if the surfaces "A" and "B" were not interleaved in the physical address space 235, then the MMU 230 would allocate a total of six 1 KB pages to store both of the surfaces "A" and "B."

Figure 5:
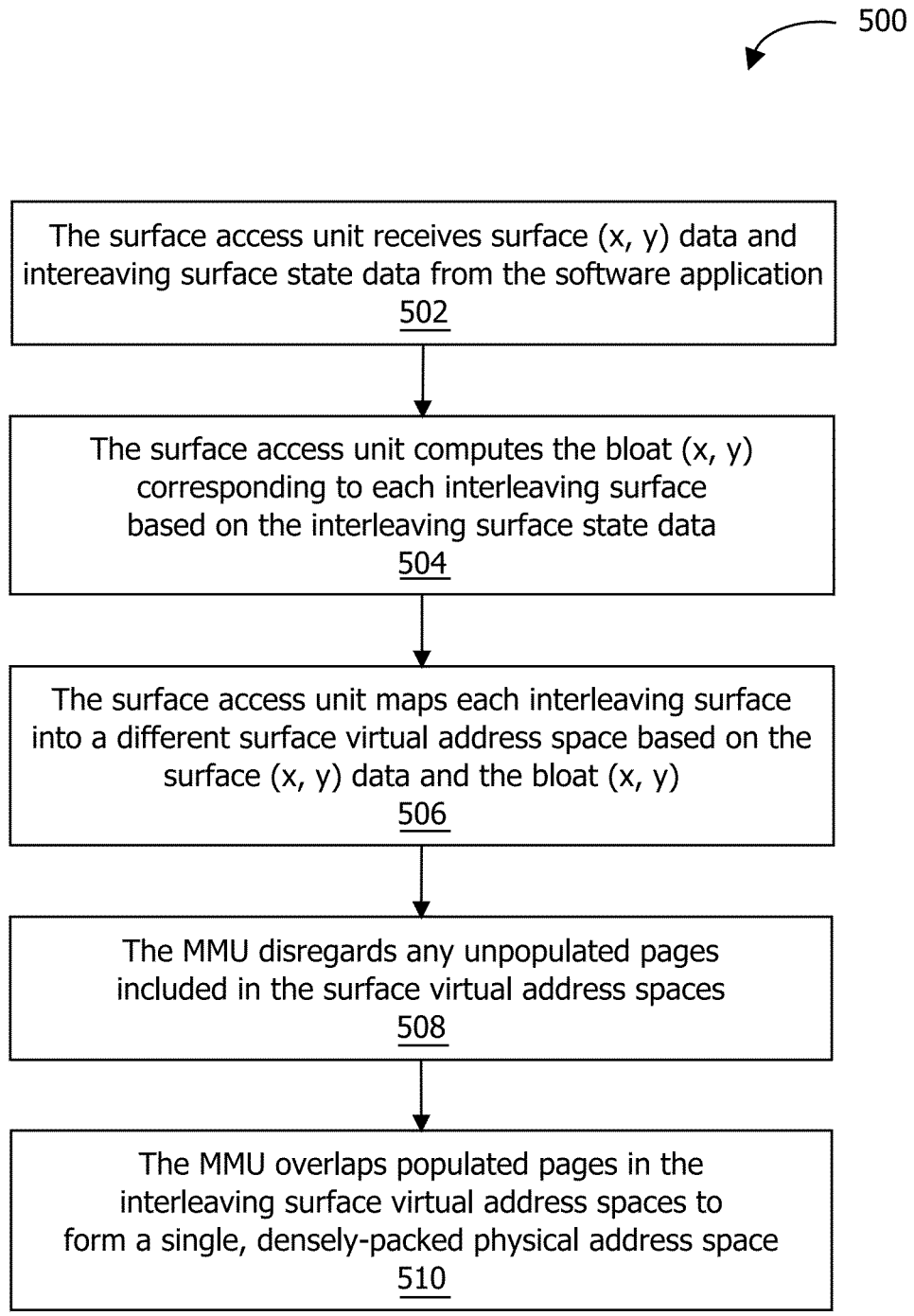
FIG. 5 is a flow diagram of method steps for mapping information from different surfaces into the same physical address space, according to one embodiment of the present invention.

FIG. 5 is a flow diagram of method steps for mapping information from different surfaces into the same physical address space, according to one embodiment of the present invention. Although the method steps are described in conjunction with the systems of FIGS. 1-4, persons skilled in the art will understand that any system configured to implement the method steps, in any order, falls within the scope of the present invention.

As shown, a method 500 begins at step 502, where the surface access unit 220, such as a ROP or a texture unit, receives data corresponding to a set of interleaving surfaces from the software application 125. The data corresponding to each of the interleaving surfaces includes surface (x, y) data 205 and surface interleaving state data 215. To ensure optimal use of the parallel processing memory 124, the software application 125 coordinates the various surface interleaving state data 215. At step 504, the surface access unit 220 computes the bloat (x, y) 315 corresponding to each of the interleaving surfaces based on the corresponding surface interleaving state data 215. As outlined previously herein, for each surface, the surface access unit 220 reads the corresponding surface interleaving state data 215 to determine one or more interleaving bits. The surface access unit 220 then computes the associated bloat (x, y) 315 by inserting the one or more interleaving bits into the set of bits corresponding to the (x, y) coordinates associated with the surface (x, y) data 205. Notably, the interleaving bits are designed to strategically insert regions of addresses that do not correspond to data into the surface virtual address space 225. In alternate embodiments, the surface access unit may compute the bloat (x, y) 315 in any technically feasible fashion.

At step 506, the surface access unit 220 maps each of the interleaving surfaces to a different surface virtual address space 225. As part of step 506, for each interleaving surface, the surface access unit 220 maps the surface (x, y) data 205 to the corresponding surface virtual address space 225 based on the bloat (x, y) 315. At step 508, the MMU 230 disregards any unpopulated pages included in any of the surface virtual address spaces 225. At step 510, the MMU 230 overlaps the populated pages of the interleaving surface virtual address spaces 225 to form a single, densely-packed, contiguous region in the physical address space 235. Advantageously, the regions of addresses in each of the surface virtual address spaces 225 that do not correspond to surface (x, y) data 205 ensure that multiple surface (x, y) data 205 are not mapped to the same address in the physical address space 235.

In sum, physical memory may be more effectively and flexibly allocated by allowing the software application to interleave surfaces, such as mipmap levels, in the physical address space. In one embodiment, a software application executing on a parallel processing subsystem specifies surface (x, y) data and interleaving surface state data (e.g., data included in a texture header). The surface state data includes a set of one or more surfaces with which the surface may interleave. Further, the surface state data includes interleaf bit insertion data that specifies the translation between (x, y) coordinates and a surface-specific virtual address space. In general, the surface state data may specify a horizontal interleave with any number of surfaces, a vertical interleave with any number of surfaces, or both a horizontal and a vertical interleave in any combination.

A surface access unit, such as a ROP or a texture unit, converts the surface (x, y) coordinates to virtual addresses based on the surface state data. In particular, when mapping the surface (x, y) coordinates to virtual addresses, the surface access unit inserts one or more interleaf bits at specified locations. By inserting the interleaf bits, the surface access unit bloats a surface virtual address space. As part of the process of bloating the surface virtual address space, the surface (x, y) data is split into tiles that are a fraction of the size of a memory page. And the extra interleaf bits cause the surface access unit to maintain regions of addresses in the surface virtual address space that do not correspond to data, thereby facilitating inter-surface interleaving in physical memory. Subsequently, the MMU disregards any empty pages included in the surface virtual address spaces. Finally, the MMU overlaps the populated pages included in interleaving surfaces by mapping individual surface virtual spaces to a single densely-packed physical space based on page indexes included in the surface state data. Because the software application and the surface access unit collaborate to strategically bloat the virtual address spaces, overlapping virtual pages included in different interleaving surfaces do not cause any data collisions.

Advantageously, the disclosed techniques enable the software application to allocate physical memory flexibly across multiple different textures to ensure that overall memory efficiency is increased. More specifically, the software application not only determines which surfaces to overlay in physical address space, but also determines the most effective interleaving stride and offset for each surface. By individualizing the interleaf pattern, the software application may pack data densely in the physical memory by interleaving multiple textures that include various allocations, sizes, and shapes. Consequently, the disclosed techniques may enable software applications to more optimally allocate physical memory, especially when working with sparse textures, than is possible using prior-art approaches to allocating physical memory.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for allocating memory to surfaces, the method comprising:
receiving first surface data related to a first surface;
receiving first surface interleaving state data related to the first surface;
computing a first bloat based on the first surface interleaving state data;
mapping the first surface data to a first surface virtual address space based on the first bloat; and
mapping one or more pages included in the first surface virtual address space to a physical address space.

2. The method of claim 1, wherein the first surface interleaving state data specifies a location and a value of one or more interleaving bits with respect to a first coordinate associated with the first surface data and a second surface associated with the first surface data.

3. The method of claim 2, wherein computing the first bloat comprises inserting the one or more interleaving bits into bits that represent coordinates associated with the first surface data.

4. The method of claim 1, further comprising:
receiving second surface data related to a second surface;
receiving second surface interleaving state data related to the second surface;
computing a second bloat based on the second surface interleaving state data;
mapping the second surface data to a second surface virtual address space based on the second bloat; and
mapping one or more pages included in the second surface virtual address space to the physical address space.

5. The method of claim 4, wherein the first surface interleaving state data and the second surface interleaving state data specify that the first surface and the second surface map to the same base address in the physical address space.

6. The method of claim 5, wherein the first surface data includes information related to a position in the first surface and the second surface data does not include information related to a corresponding position in the second surface.

7. The method of claim 5, wherein the first surface and the second surface differ in at least one of shape and size.

8. The method of claim 1, wherein the first surface comprises a texture.

9. The method of claim 8, wherein the texture comprises a level of a mipmap.

10. A non-transitory computer-readable storage medium including instructions that, when executed by a processing unit, cause the processing unit to allocate memory to surfaces by performing the steps of:
receiving first surface data related to a first surface;
receiving first surface interleaving state data related to the first surface;
computing a first bloat based on the first surface interleaving state data;
mapping the first surface data to a first surface virtual address space based on the first bloat; and
mapping one or more pages included in the first surface virtual address space to a physical address space.

11. The computer-readable storage medium of claim 10, wherein the first surface interleaving state data specifies a location and a value of one or more interleaving bits with respect to a first coordinate associated with the first surface data and a second surface associated with the first surface data.

12. The computer-readable storage medium of claim 11, wherein computing the first bloat comprises inserting the one or more interleaving bits into bits that represent coordinates associated with the first surface data.

13. The computer-readable storage medium of claim 10, further comprising:
receiving second surface data related to a second surface;
receiving second surface interleaving state data related to the second surface;
computing a second bloat based on the second surface interleaving state data;
mapping the second surface data to a second surface virtual address space based on the second bloat; and
mapping one or more pages included in the second surface virtual address space to the physical address space.

14. The computer-readable storage medium of claim 13, wherein the first surface interleaving state data and the second surface interleaving state data specify that the first surface and the second surface map to the same base address in the physical address space.

15. The computer-readable storage medium of claim 14, wherein the first surface data includes information related to a position in the first surface and the second surface data does not include information related to a corresponding position in the second surface.

16. The computer-readable storage medium of claim 14, wherein the first surface and the second surface differ in at least one of shape and size.

17. The computer-readable storage medium of claim 10, wherein the first surface comprises a texture.

18. The computer-readable storage medium of claim 17, wherein the texture comprises a level of a mipmap.

19. A system configured to allocate memory to surfaces, the system comprising:
   a surface access unit configured to:
      receive first surface data related to a first surface,
      receive first surface interleaving state data related to the first surface,
      compute a first bloat based on the first surface interleaving state data, and
      map the first surface data to a first surface virtual address space based on the first bloat; and
   a memory management unit configured to:
      map one or more pages included in the first surface virtual address space to a physical address space.

20. The system of claim 19, wherein the first surface interleaving state data specifies a location and a value of one or more interleaving bits with respect to a first coordinate associated with the first surface data and a second surface associated with the first surface data.

* * * * *